(12) United States Patent
Saho et al.

(10) Patent No.: US 8,002,976 B2
(45) Date of Patent: Aug. 23, 2011

(54) MAGNETIC SEPARATION FILTERING AND CLEANING APPARATUS

(75) Inventors: Norihide Saho, Tsuchiura (JP); Hisashi Isogami, Ushiku (JP); Akira Mochizuki, Mito (JP); Tomoko Akiyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 847 days.

(21) Appl. No.: 12/019,674

(22) Filed: Jan. 25, 2008

(65) Prior Publication Data

US 2008/0237098 A1 Oct. 2, 2008

(30) Foreign Application Priority Data

Mar. 27, 2007 (JP) ................................. 2007-082323

(51) Int. Cl.
*B01D 35/06* (2006.01)
*B03C 1/30* (2006.01)
*C02F 1/48* (2006.01)

(52) U.S. Cl. ........ 210/137; 210/695; 210/143; 210/222; 210/223; 210/396; 210/402; 209/223.2

(58) Field of Classification Search ............... 210/222, 210/223, 396, 402, 695, 137, 143; 209/223.2
See application file for complete search history.

(56) References Cited

U.S. PATENT DOCUMENTS

| 2,720,974 A * | 10/1955 | Fowler | 210/223 |
| 5,496,470 A * | 3/1996 | Lenhart | 210/222 |
| 7,785,475 B2 * | 8/2010 | Saho et al. | 210/695 |
| 2008/0029457 A1 | 2/2008 | Saho et al. | |

FOREIGN PATENT DOCUMENTS

| EP | 1 875 967 | 1/2008 |
| JP | 2002-273261 | 9/2002 |
| WO | WO 2006/117880 | 11/2006 |

OTHER PUBLICATIONS

Chinese Office Action of Application No. 200810003596.5 dated Jan. 8, 2010 with translation.

* cited by examiner

*Primary Examiner* — David A Reifsnyder
(74) *Attorney, Agent, or Firm* — Antonelli, Terry, Stout & Kraus, LLP.

(57) ABSTRACT

A magnetic separation filtering and cleaning apparatus for adding flocculant and magnetic powder to raw water containing pollutant particles to form magnetic floc in treated fluid and separating and removing the magnetic floc from the treated fluid, comprising: a magnetic field generation device being provided in a rotating body for suctioning the magnetic floc on a surface of the rotating body from the treated fluid containing the magnetic floc, a magnetic field rotating device for rotating the magnetic field generation device, a sludge recovery device for separating sludge including the magnetic floc mechanically from the surface of the rotating body of the magnetic field generation device; and a filtering device having a rotating net for filtering out the magnetic floc from the treated fluid including the magnetic floc and flowing down the treated fluid filtered through the rotating net.

16 Claims, 5 Drawing Sheets

MAGNETIC SEPARATION FILTERING AND CLEANING APPARATUS

CLAIM OF PRIORITY

The present application claims priority from Japanese application serial No. 2007-082323, filed on Mar. 27, 2007, the content of which is hereby incorporated by reference into this application.

BACKGROUND OF THE INVENTION

1. Field of Technology

The present invention relates to a sewage cleaning apparatus intended for water clarification and solid-liquid separation, and in particular, relates to a magnetic separation filtering and cleaning apparatus for trapping magnetic materials by a membrane and magnetically separating trapped materials.

2. Prior Art

There is a well-known magnetic separation sewage cleaning apparatus (for example, see Japanese Application Patent Laid-open Publication No. 2002-273261) in which a net woven out of thin wires or polymeric fibers is used as a water separation membrane for the purpose of solid-liquid separation, flocculant and magnetic powder are added to raw water containing pollutant particles to form magnetic floc, the magnetic floc is separated by the membrane, and the magnetic floc trapped by the membrane is magnetically removed by a magnetic field generation means, thereby recovering highly concentrated sludge.

The above-mentioned membrane separation cleaning apparatus is equipped with a net woven out of stainless-steel thin wires or polyester fibers, and has, for example, a membrane molecular portion having a several tens of micronmeter mesh opening. In order to separate microscopic pollutants smaller than the projected area or a projected diameter of the opening, for example, aluminum sulfate, polyaluminum chloride, iron polysulfate, and magnetic powder are beforehand added to raw water as flocculant and stirred so that microscopic suspended solids, algae, fungi, and microorganisms contained in raw water are flocculated by a flocculant to form several hundred micron meter magnetic floc. The magnetic floc cannot pass through the opening of a several tens of micron meter mesh and is trapped and separated at a high elimination ratio, and the water filtered through the membrane becomes high-quality clarified water.

Magnetic floc trapped on the membrane is washed off from the membrane by cleaning water. Then, magnetic floc which remains on and around the surface of the water is suctioned by a magnetic force of a magnet immobilized near the water surface, magnetically separated, and transferred by a sludge transfer device to a sludge recovery tank and eliminated. Eventually, sludge is normally carried by a truck to a repository site or an incineration site or made into compost.

SUMMARY OF THE INVENTION

In a conventional magnetic separation sewage cleaning apparatus, when microscopic suspended solids in raw water are highly concentrated, a large amount of magnetic floc is generated. When the magnetic floc reaches a membrane, the magnetic floc is filtered and trapped on the entire surface of the membrane thereby significantly decreasing the membrane's ability to flow water. Accordingly, when treating a large amount of raw water, there is a problem in that a large filtering area is necessary, which increases the size of the components of the filtering device, increasing the size of the cleaning apparatus; consequently, the apparatus manufacturing costs increase. Furthermore, if the size of the components of the filtering device increases, the filtering device has to be divided into a plurality of devices in some cases. In that case, the number of installed magnetic components, which magnetically suction magnetic floc cleaned and separated from the filtering device increases; consequently there is a problem in that the size of the magnetic components increases thereby increasing the apparatus manufacturing costs.

The object of the present invention is to provide a magnetic separation filtering and cleaning apparatus with compact size.

(1) In order to achieve the above object, the present invention of a magnetic separation filtering and cleaning apparatus for adding flocculant and magnetic powder to raw water containing pollutant particles to form magnetic floc in treated fluid and separating and removing the magnetic floc from the treated fluid, comprising: a magnetic field generation device being provided in a rotating body for suctioning the magnetic floc on a surface of the rotating body from the treated fluid containing the magnetic floc, a magnetic field rotating device for rotating the magnetic field generation device, a sludge recovery device for separating sludge including the magnetic floc mechanically from the surface of the rotating body of the magnetic field generation device; and a filtering device having a rotating net for filtering out the magnetic floc from the treated fluid including the magnetic floc and flowing down the treated fluid filtered through the rotating net.

(2) In the above first aspect of the present invention, it is preferable that the magnetic field generation device comprising a plurality of permanent magnets being provided in the rotating body, and a protection body for protecting the plurality of permanent magnets to keep them watertight.

(3) In the above second aspect of the present invention, it is preferable that the magnetic field generation device comprising a plurality of permanent magnets being provided in the rotating body, a protection body for protecting the plurality of permanent magnets to keep them watertight, and a clamping device for fixing the rotating body onto the protection body.

(4) In the above first aspect of the present invention, it is preferable that further comprising a control device for controlling a rotation speed of the magnetic field rotating device to rotate the magnetic field generation device in synchronization with the flow velocity of the treated fluid containing the magnetic material.

According to the present invention, it is possible to provide a magnetic separation filtering and cleaning apparatus with compact size.

DETAILED DESCRIPTION OF THE INVENTION

First Embodiment

Hereafter, configuration of a magnetic separation filtering and cleaning apparatus according to an embodiment of the present invention will be described with reference to FIGS. 1 through 3.

Figure 1:
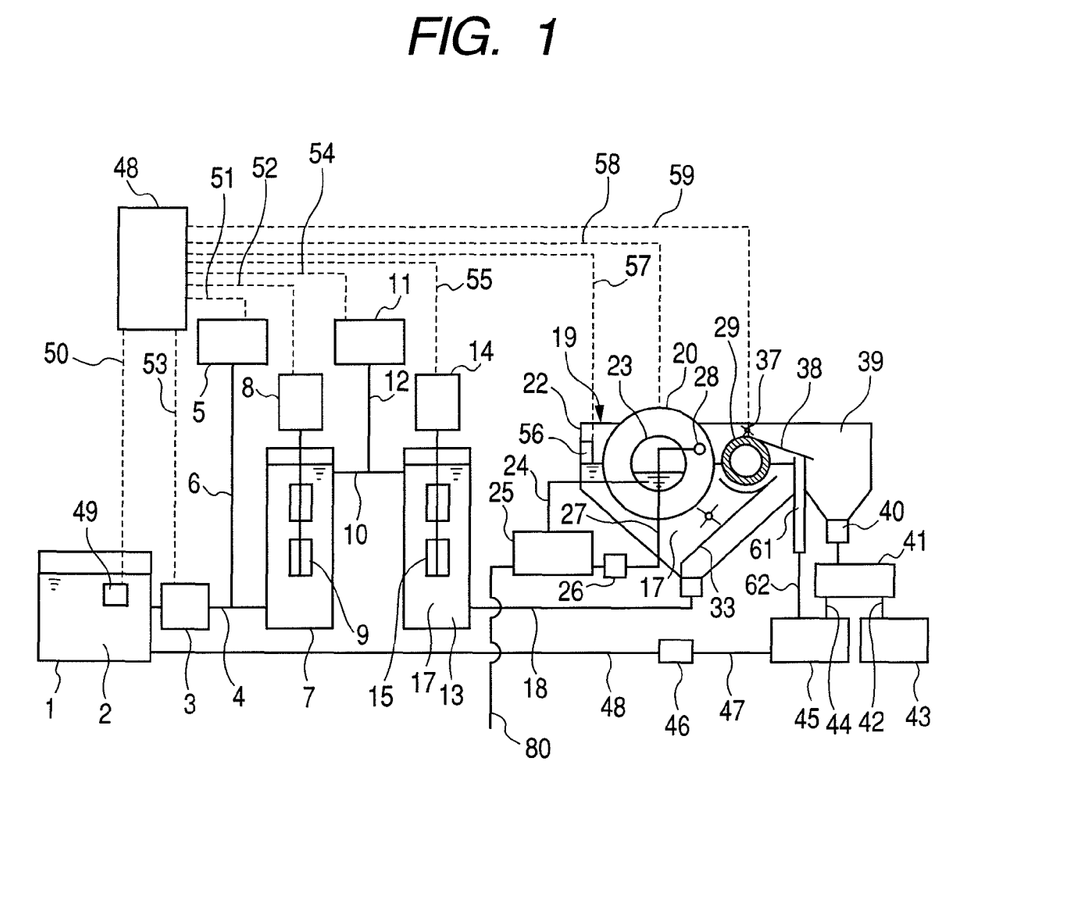
FIG. 1 is an entire configuration drawing of a magnetic separation filtering and cleaning apparatus to show an embodiment of the present invention.

FIG. 1 is an entire configuration drawing of a magnetic separation filtering and cleaning apparatus to show an embodiment of the present invention. FIG. 2 is an enlarged cross-sectional view of a membrane separation device used for the embodiment of the magnetic separation filtering and cleaning apparatus shown in FIG. 1. FIG. 3 is a cross-sectional view taken substantially along the line A-A of FIG. 2.

As shown in FIG. 1, raw water 2 that is treated water from which several millimeter foreign particles have been removed is stored in a raw water storage tank 1. A prescribed amount of the stored raw water 2 is pumped by a pump 3 and sent to the piping 4. Through a conduit 6 into the piping 4, a seeding agent adjusting device 5 adds magnetic powder including ferrous-ferric oxide or the like, pH adjuster, flocculant such as aqueous solution of polyaluminum chloride, ferric chloride, or ferric sulfate which provides aluminum ion and iron ion, and polymer strengthening agent. In an agitation tank 7, an agitation blade 9 driven and rotated by a motor 8 stirs the mixture at a high speed to generate several hundred micron meter magnetic micro floc.

After that, a polymer agent adjusting device 11 adds a polymer strengthening agent or the like into the piping 10 through a conduit 12. In an agitation tank 13, an agitation blade 15 driven and rotated by a motor 14 stirs the mixture at a low speed to generate pretreatment water 17 that contains several millimeter magnetic floc (magnetic floc 16 shown in FIG. 2).

Pretreatment water 17 thus generated is sent to a magnetic separation and membrane separation device 19 through a conduit 18. The magnetic separation and membrane separation device 19 comprises a rotating drum 20 for filtering and a magnet 29.

Herein, the structure of a magnetic separation and membrane magnetic separation apparatus 19 will be described with reference to FIGS. 2 and 3.

Figure 2:
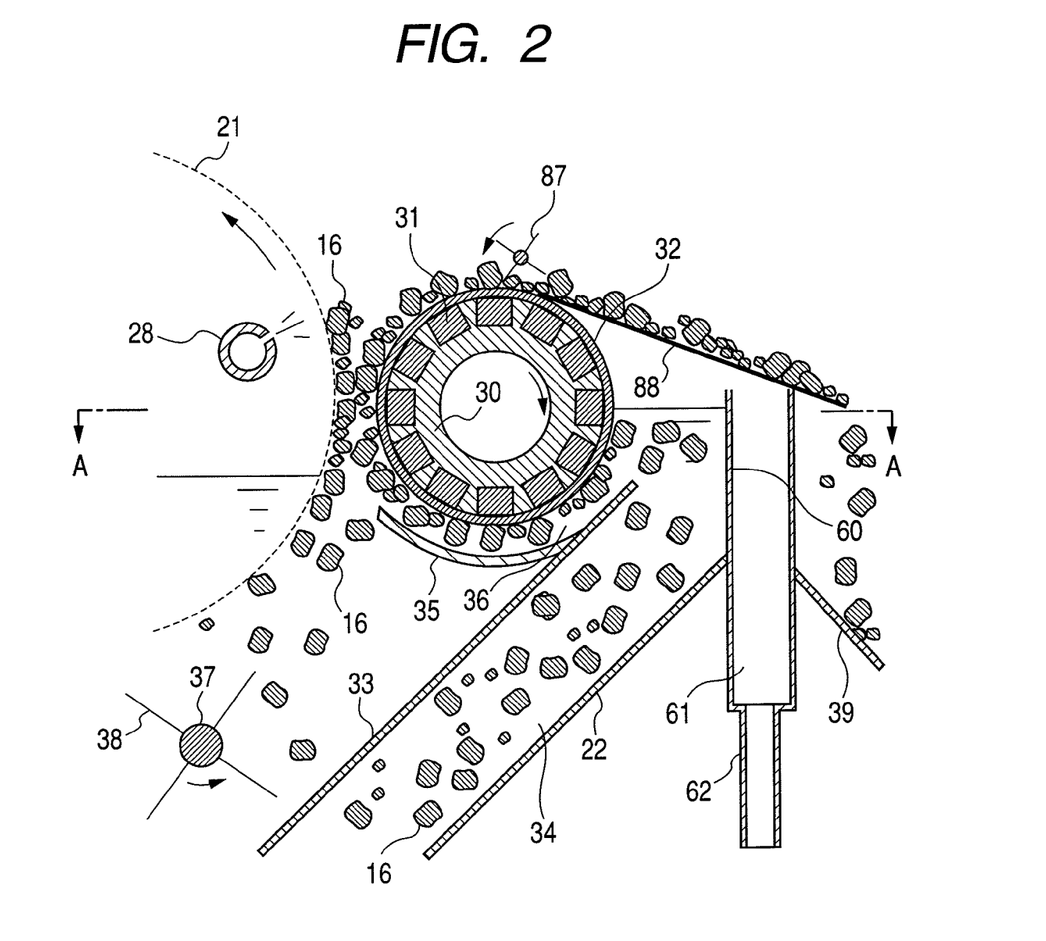
FIG. 2 is an enlarged cross-sectional view of a membrane separation device used for the embodiment of the magnetic separation filtering and cleaning apparatus shown in FIG. 1.

As shown in FIG. 2, a net 21 is disposed on the outer circumferential surface of the rotating drum 20 shown in FIG. 1. The net 21 is made of thin stainless-steel wires, thin copper wires, or polyester fibers to form a membrane having an opening with a mesh of between several micron meters and several tens of micron meters.

On the other hand, a rotary magnet 29, shown in FIG. 1, used as a magnetic field generation device to execute magnetic separation is structured, as shown in FIG. 2, such that a plurality of permanent magnetic bodies 31 are immobilized by an adhesive onto a plurality of grooves located on the outer surface of the rotating body 30 made of nonmagnetic material and the structure is covered by a protection tube 32 to ensure the watertight. The rotating body 30 rotates while the motor 72, shown in FIG. 3, controls the number of revolutions. The rotational axis 70 of the rotating body 30 is supported by a watertight bearing 71.

In FIG. 1, pretreatment water 17 flown into the tank 22 flows inside the flow channel 34 (FIG. 2) constructed by a partition wall 33 and flows into the flow channel 36 which is separated from the inside of the tank 22 by a partition wall 35, as shown in FIG. 2. The flow channel 36 is disposed close to the permanent magnet body 31 which rotates in the same direction as pretreatment water flows and at almost the same velocity. Most of magnetic floc 16 contained in the pretreatment water that has flown into the flow channel 36 is magnetically suctioned therein, trapped on the surface of the watertight protection tube 32, and magnetically separated from the pretreatment water.

In FIG. 2, pretreatment water from which most of magnetic floc 16 has been magnetically separated is discharged from an outlet of the flow channel 36 into the tank 22. Herein, pretreatment water passes through the net 21 of the rotating drum 20 from outside to the inside, and at that point in time, magnetic floc 16 that remains in the pretreatment water is trapped on the outer surface of the net 21. The water that has passed through the net 21 and been removed from magnetic floc 16 becomes clarified water, is then discharged from the opening 23, shown in FIG. 1, passes through the piping 24, stored in the clarified tank 25, and then discharged outside the system through the piping 80.

Herein, as shown in FIG. 2, motive energy that enables pretreatment water 17 to pass through the net 21 is a water level difference between the pretreatment water 17 and the clarified water in the drum 20. Since magnetic floc that has not reached the net 21 tends to deposit toward the bottom of the tank 22, magnetic floc is moved close to the net 21 by a stirred flow generated by an agitation blade 38 mounted to the rotational axis 37 (the rotary drive is not shown) located in the tank 22, filtered and trapped by the filtering water flow. In FIG. 2, magnetic floc 16 which has been filtered and attached to the outer surface of the net 21 that rotates counter-clockwise becomes sediment and is exposed to the air above the water level.

In FIG. 1, clarified water in the clarified tank 25 is pressurized by a pump 26 and sent to a shower pipe 28 through a conduit 27. As shown in FIG. 2, shower water sprays through a hole of the shower pipe 28 from the inner surface of the net 21 toward the outer surface side. Magnetic floc 16 accumulated on the outer surface of the net 21 is removed by shower water sprayed from the shower pipe 28, and the surface of the net 21 is cleaned for the next use. Washed out magnetic floc 16 remains on the surface of the pretreatment water 17 in the tank 22.

In FIG. 2, a flock of magnetic floc 16 that has washed out and remains on and around the water surface is suctioned and moved toward the magnet due to a magnetic field of the permanent magnet body 31 that rotates clockwise while trapping magnetic floc 16 that has been magnetically suctioned in the flow channel 36. The flock of magnetic floc 16 is then trapped and attached to the outer surface of the protection tube 32 which rotates together with the permanent magnet body 31 and is exposed to the air as the permanent magnet body 31 rotates. In the air, excess water contained in the flock of magnetic floc 16 flows down by gravity, returned to the tank 22, and the flock of magnetic floc 16 is further concentrated. Herein, the water content of magnetic floc 16 decreases to approximately 97%. The flock of magnetic floc 16 concentrated on the surface of the protection tube 32 is moved as the protection tube 32 rotates.

Therefore, according to the structure of this embodiment, it is possible to significantly reduce the filtering load of the filtering device by magnetically separating most of magnetic floc 16 in the filtering and clarifying pretreatment process; therefore, it is possible to clarify a large amount of raw water without increasing the size of the filtering device in the post-process. Furthermore, because the filtered magnetic floc 16 can be removed from the filtering membrane 21 by cleaning water and magnetically separated by the magnet, it is possible to discharge magnetic floc 16 to the outside at a high speed. As a result, the size of the apparatus can be reduced. Moreover, the same magnet 29 (permanent magnet body 31) can magnetically separate both magnetic floc 16 in the flow channel 36 and magnetic floc 16 washed out by the cleaning water from outer surface of the membrane 21 at the same time without providing different magnets; therefore, it is possible to reduce the size of the apparatus and decrease apparatus manufacturing costs.

As shown in FIG. 2, a flock of magnetic floc 16 is mechanically broked and removed from the surface of the protection tube 32 by a rotating brush 87 and a spatula 88 supported by a part of the tank 22, drops into a sludge recovery tank 39 by gravity, and separated and collected as sludge.

In FIG. 1, sludge discharged to a sludge recovery tank 39 is directed to a dewatering apparatus 41, such as a centrifuge or beltpress dewatering apparatus, through the piping 40, and the water content is reduced to approximately 85% or less so that water will not leak from the sludge during transportation. Furthermore, highly concentrated sludge whose water content is approximately 75% so as to activate microorganisms that break down organic matter during composting is stored in the sludge tank site 43 through the piping 42. Sludge is transported by truck to a repository site, incineration site and a compost treatment site. Treated sewage dewatered by a dewatering apparatus is sent to a treated sewage tank 45 through the piping 44, passes through the piping 47, is pressurized by a pump 46, then, returned to a raw water tank 1 through the piping 48, and directed to the pretreatment process again.

In FIG. 1, a sensor 49 measures the water level, turbidity, temperature, pHm value of raw water 2, and sends the measured information to a drive control device 48 via a signal line 50. Based on the measured information, the drive control device 48 calculates the additive amount of chemical agents (pH adjuster, magnetic powder, flocculant) most suitable for the generation of good magnetic floc by using an optimal amount calculation program that has been inputted beforehand, then sends the control information to a chemical agent tank 5 via a signal line 51, and then optimal amount of chemical agents are added.

Furthermore, simultaneously, the drive control device 48 calculates the number of revolutions of the agitation motor 8, sends the control information to the motor 8 via a signal line 52, and then rotates the agitation blade 9 by the motor 8 at the optimal number of revolutions. Moreover, the drive control device 48 calculates residence time in the agitation tank 7 and sends the data via a signal line 53, thereby controlling the discharge rate of the pump 3 that determines the residence time in the agitation tank 7.

Furthermore, the drive control device 48 calculates the additive amount of chemical agents (polymer) most suitable for the generation of good magnetic floc by using an optimal amount calculation program that has been inputted beforehand, then sends the control information to a chemical agent tank 11 via a signal line 54, and then the optimal amount of chemical agents are added.

Furthermore, simultaneously, the drive control device 48 calculates the number of revolutions of the agitation motor 14, sends the control information to the motor 14 via a signal line 55, and then rotates the agitation blade 15 by the motor 14 at the optimal number of revolutions.

On the other hand, the membrane separation device 19 measures the level of pretreatment water 17 in the tank 22 by using a sensor 56 and sends the measured information to the drive control device 48 via a signal line 57. Based on the measured information, the drive control device 48 calculates the optimal number of revolutions of the rotating drum 20 and appropriate recovery speed of a flock of magnetic floc 16 by using an optimal amount calculation program that has been inputted beforehand so that the level of the pretreatment water is located almost in the middle of the installation position of the magnet 29, that is, the location at which an average value of the magnetic field generated by a magnet 29 is maximum. Then, the drive control device 48 sends the control signal to a rotation motor (not shown) of the rotating drum 20 via a signal line 58, and subsequently sends the signal to the motor 72 for the rotary magnet (FIG. 3) via a signal line 59, thereby controlling the optimal number of revolutions.

Furthermore, in the case in which the level of pretreatment water in the tank 22 increases when the amount of water filtered by the net 21 becomes less than the amount of inflow due to the insufficient number of revolutions of the net 21 or other reasons, overflow of the pretreatment water from the tank 22 into the sludge recovery tank 39 over the wall 60 must be inhibited; therefore, an overflow water recovery tank 61 is provided. Overflow water flown in the overflow water recovery tank 61 is sent to the treated sewage tank 45 through the piping 62, pressurized by a pump 46, and then returned to the raw water tank 1 through the piping 47.

This structure allows the level of pretreatment water in the tank 22 to increase and the pretreatment water 17 that has flown over the wall 60, as shown in FIG. 2, is flown into the overflow water recovery tank 61 instead of flowing into the sludge tank 39. Therefore, the water content of highly concentrated sludge recovered in the sludge tank 39 increases due to the inflow of the pretreatment water, and the concentration decreases increasing the volume of the sludge; consequently, increase of sludge treatment cost can be prevented.

As stated above, according to this embodiment, since approximately 90% of magnetic floc 16 contained in the pretreatment water in the flow channel 36 is magnetically separated by a rotary magnet 29, only approximately 10% of magnetic floc 16 is filtered by a rotating drum 20, which device that the load is significantly small; therefore, the area of the membrane 21 of the rotating drum 20 can be small and it is possible to reduce the size of the filtering device. Furthermore, because the filtered magnetic floc 16 is removed from the filtering membrane 21 by using cleaning water and magnetically separated by a magnet, it is possible to discharge magnetic floc 16 to the outside the apparatus at a high speed. As a result, the size of the apparatus can be small. Moreover, magnetic floc 16 in the flow channel 36 and magnetic floc 16 in the cleaning water washed out from the membrane 21 can be magnetically separated simultaneously by the same magnet 29 without providing different magnets to execute magnetic separation individually; therefore, the size of the apparatus can be small and the apparatus manufacturing cost can be reduced.

Second Embodiment

Next, the configuration of a magnetic separation filtering and cleaning apparatus according to another embodiment of the present invention will be described by referring to FIGS. 4 and 5. The entire configuration of the magnetic separation filtering and cleaning apparatus according to this embodiment is the same as that shown in FIG. 1.

Figure 4:
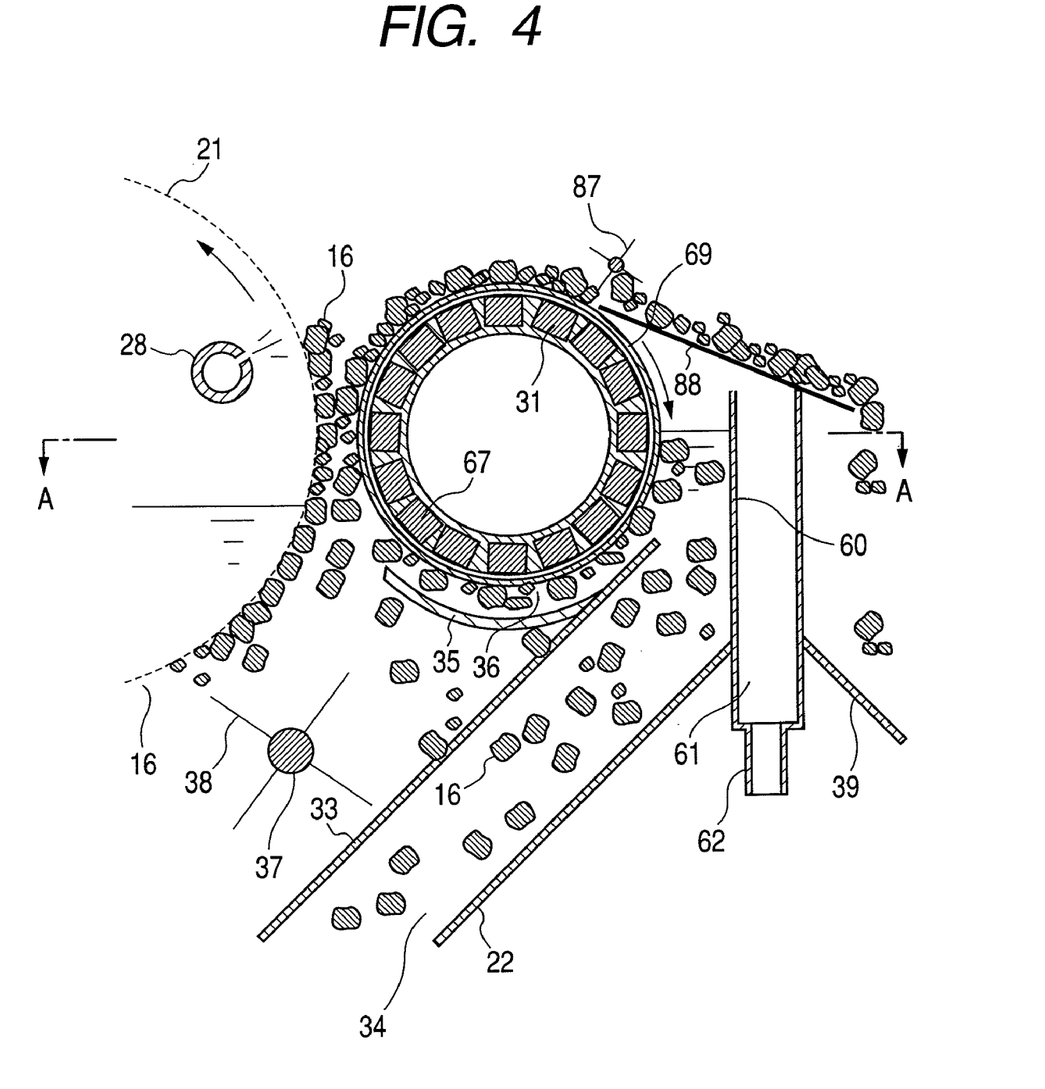
FIG. 4 is an enlarged cross-sectional view of another membrane separation device used for the embodiment of magnetic separation filtering and cleaning apparatus shown in FIG. 1.
Figure 5:
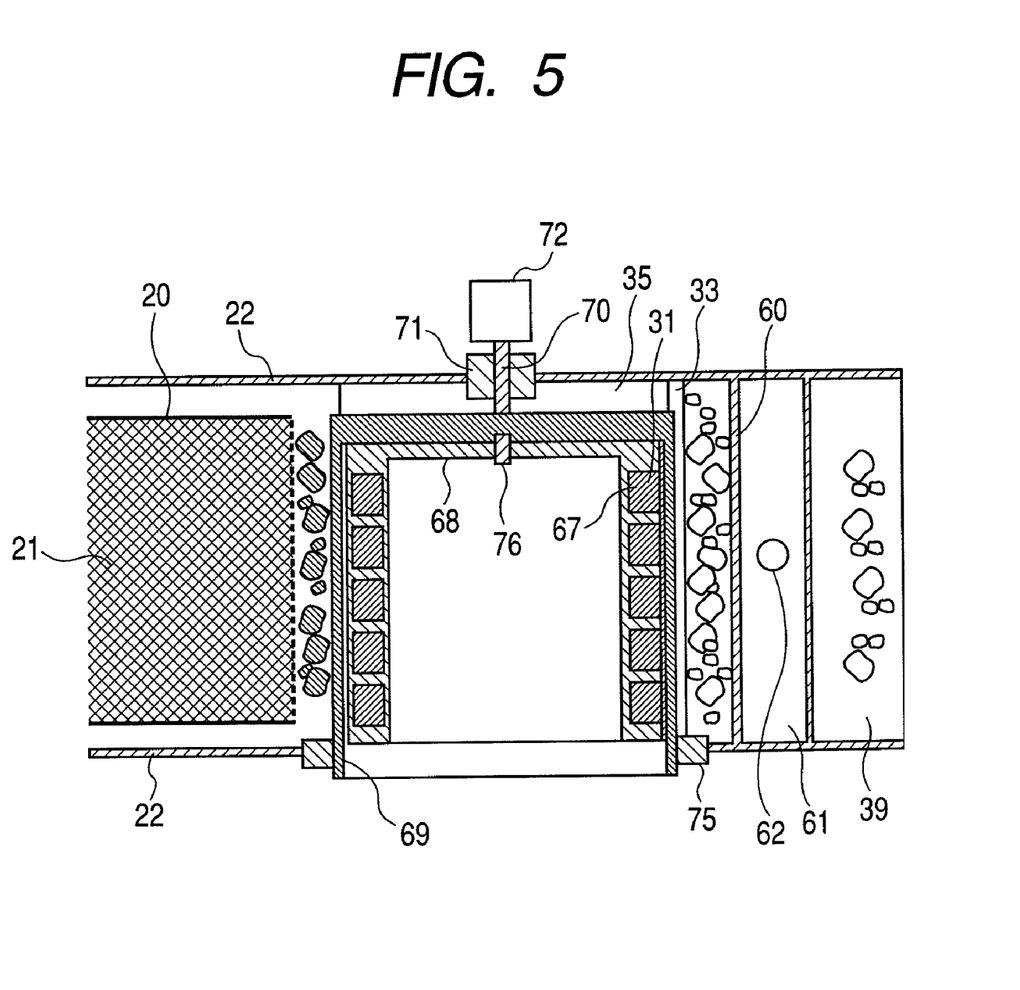
FIG. 5 is a cross-sectional view taken substantially along the line A-A of FIG. 4.

FIG. 4 is an enlarged cross-sectional view of another membrane separation device used for the embodiment of magnetic separation filtering and cleaning apparatus shown in FIG. 1. FIG. 5 is a cross-sectional view taken substantially along the line A-A of FIG. 4. Moreover, the same numbers and alphanumeric characters as those shown in FIGS. 1 through 3 indicate the same portions.

Figure 3:
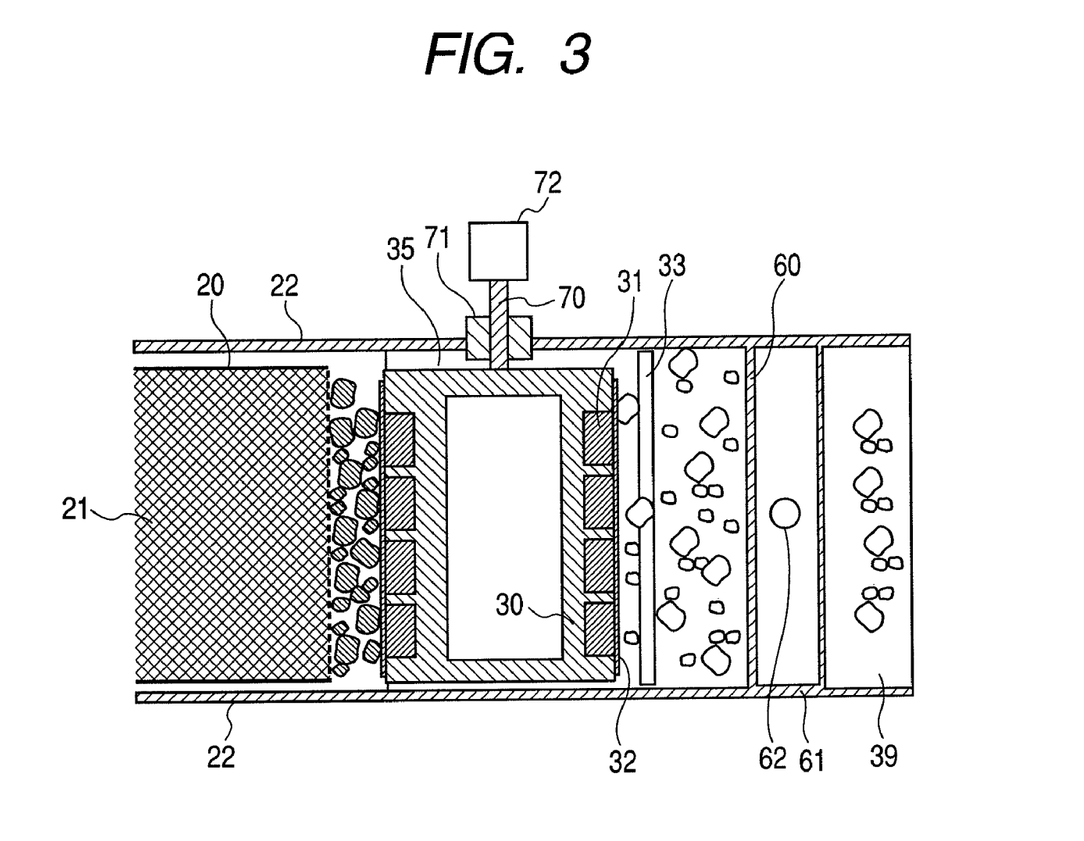
FIG. 3 is a cross-sectional view taken substantially along the line A-A of FIG. 2.

The difference between this embodiment and the embodiment shown in FIGS. 2 and 3 is that the rotating body 67 and the protection tube 69 of the rotary magnet 68 in this embodiment are separated from each other and the rotating body 67 can be mounted and removed from the air side. Moreover, the rotary magnet 68 comprises a rotary body 67 and a permanent magnet 66 fixed onto the rotating body 67.

The protection tube 69 is made as large as possible to fit the inside and rotates by a motor 72 in a prescribed direction. The rotational axis 70 is supported by a watertight bearing 71, and the protection tube 69 is supported by a watertight bearing 75. The rotary magnet 68 is immobilized to the protection tube 69 by a clamping device such as a bolt 76 and operates as one body with the protection tube 69.

According to this structure, in the case in which, for example, microscopic iron dust in raw water is magnetically suctioned during operation and trapped on the outer surface of the protection tube 69, comes in contact with the membrane 21 while rotating, it is possible to remove the bolt 76 and remove the rotary magnet 68 from the apparatus, and thus a magnetic force is eliminated, making it possible to remove microscopic iron dust from the outer surface of the protection tube 69. Furthermore, the rotation function can be obtained by integrating the rotary magnet 68 by a bolt into one unit without providing a rotary drive system on the rotary magnet 68; therefore, apparatus manufacturing costs can be further reduced when compared to the case in which rotary drive device are separately provided.

Furthermore, in this embodiment, by eliminating a difference between the flow velocity inside the flow channel 36 and the circumferential velocity of the permanent magnet 31 provided in the rotary magnet 68, efficiency is increased in the magnetic suction of magnetic floc 16 that flows almost as fast as water flows in the flow channel 36. Flow velocity in the flow channel 36 fluctuates according to the flow rate of raw water. Therefore, the drive control device 48 obtains a flow rate in the flow channel 36 from the operating conditions of the operating pump 3, shown in FIG. 1, or from a flowmeter (not shown); obtains an average flow velocity based on the cross-sectional area calculated by the dimensions of the flow channel 36; calculates the number of revolutions that can obtain circumferential velocity almost identical to the abovementioned average flow velocity according to the outer diameter of the protection tube 32 or 69 of the rotary magnet 29 or 68; and controls the number of revolutions of the motor 72 via a signal line 59; consequently, it is possible to eliminate the velocity difference, increasing the efficiency in the magnetic suction of magnetic floc 16. Accordingly, the filtering load of the filtering device can be further reduced by increasing the efficiency in the magnetic separation of magnetic floc 16 in the filtering and clarifying pretreatment process; therefore, the size of the post-process filtering device can be further reduced.

In the embodiment stated above, a permanent magnet is used as a magnetic field generation device; however, the same effects can be obtained by using a normal conduction electromagnet or a superconducting electromagnet cooled by the freezer or the like.

Moreover, although a drum-type net 21 has been described in the above embodiments, the net 21 can be a disk, and a plurality of disks can be vertically disposed to configure an apparatus so as to obtain the same effects.

Moreover, in the above embodiments, the drum-type rotating body 30 or 67 is made of nonmagnetic material, a plurality of permanent magnets 31 are immobilized on the circumferential surface thereof by an adhesive or the like, and the entire configuration is covered by the protection tube 32 or 69. However, the same effects can be obtained in the case in which a structure is made such that a plurality of permanent magnets 31 are bonded with an adhesive onto the circumferential surface and both sides of a disk-type rotating body 30 and the entire structure is covered by a roof-shaped protector instead of using a protection tube 32; and a plurality of the disk-type rotating body 30 or 67 are arranged in a row at prescribed intervals to form a group of disks and disposed in the flow channel 36; then the magnetic floc 16 in the flow channel 36 is trapped by a magnetic force of the permanent magnets immobilized on the circumferential surface and both sides of the rotating disk group; and then the trapped the magnetic floc 16 on the rotating disk group is scraped and removed by a specified spatula disposed along the protector covering over the circumferential surface and both sides of the group of disks.

What is claimed is:

1. A magnetic separation filtering and cleaning apparatus for adding flocculant and magnetic powder to raw water containing pollutant particles to form magnetic floc in treated fluid and separating and removing the magnetic floc from the treated fluid, comprising:
   a tank configured to receive a treated fluid including magnetic floc,
   a first flow channel which is formed between a first partition wall inside the tank and a wall of the tank to flow the treated fluid supplied from outside to inside of the tank,
   a magnetic field generation device being provided in a rotating body for suctioning the magnetic floc on a surface of the rotating body from the treated fluid containing the magnetic floc,
   a magnetic field rotating device for rotating the magnetic field generation device,
   a second flow channel which is formed between a second partition wall connected to the first partition wall and the magnetic field generation device to flow the treated fluid supplied through the first flow channel to the magnetic field generation device,
   a sludge recovery device for separating sludge including the magnetic floc mechanically from the surface of the rotating body of the magnetic field generation device; and
   a filtering device having a rotating net for filtering out the magnetic floc from the treated fluid including the magnetic floc by flowing the treated fluid through the rotating net.

2. The magnetic separation filtering and cleaning apparatus according to claim 1, wherein
   the magnetic field generation device comprises a plurality of permanent magnets in the rotating body, and a protection body for protecting the plurality of permanent magnets to keep them watertight.

3. The magnetic separation filtering and cleaning apparatus according to claim 1, wherein
   the magnetic field generation device comprises a plurality of permanent magnets in the rotating body, a protection body for protecting the plurality of permanent magnets to keep them watertight, and a clamping device for fixing the rotating body onto the protection body.

4. The magnetic separation filtering and cleaning apparatus according to claim 1, further comprising:
   a control device for controlling a rotation speed of the magnetic field rotating device to rotate the magnetic field generation device in synchronization with a flow velocity of the treated fluid containing the magnetic floc in the second flow channel.

5. The magnetic separation filtering and cleaning apparatus according to claim 1, wherein
the first flow channel has an entrance and an exit, the second flow channel has an entrance and an exit, and the exit of the first flow channel is in communication with the entrance of the second flow channel.

6. The magnetic separation filtering and cleaning apparatus according to claim 5, further comprising:
a control device for controlling a rotation speed of the magnetic field rotating device to rotate the magnetic field generation device in synchronization with a flow velocity of the treated fluid containing the magnetic floc in the second flow channel.

7. The magnetic separation filtering and cleaning apparatus according to claim 1, wherein
the filtering device is a rotating drum and the net disposed over an outer circumferential surface of the rotating drum.

8. The magnetic separation filtering and cleaning apparatus according to claim 7, further comprising
a shower pipe disposed on an inner side of the of the rotating net, the shower pipe is positioned to spray a clarified fluid on the inner side of the rotating net to remove accumulated magnetic floc from an outer side of the rotating net.

9. The magnetic separation filtering and cleaning apparatus according to claim 1, further comprising
a shower pipe disposed on a first side of the of the rotating net, the shower pipe is positioned to spray a clarified fluid on the first side of the rotating net to remove accumulated magnetic floc from a second side of the rotating net.

10. A magnetic separation filtering and cleaning apparatus for removing magnetic floc from a treated fluid, comprising:
a tank configured to receive a treated fluid including magnetic floc,
a first flow channel formed between a first partition wall disposed inside the tank and a wall of the tank, the first flow channel receiving the treated fluid including magnetic floc at an entrance to the tank, a first end of the first partition wall is proximate to the entrance of the tank and a second end of the first partition wall is proximate to an exit of the first flow channel,
a magnetic field generation device in a rotating body for suctioning the magnetic floc from the treated fluid including the magnetic floc onto a surface of the rotating body,
a magnetic field rotating device for rotating the magnetic field generation device,
a second flow channel communicating with the first flow channel, the second flow channel is formed between a second partition wall and the magnetic field generation device, a first end of the second partition wall is connected to the second end of the first partition wall, and the second flow channel flowing the treated fluid including the magnetic floc to the magnetic field generation device,
a sludge recovery device for mechanically separating sludge including the magnetic floc from the surface of the rotating body of the magnetic field generation device; and
a filtering device having a rotating net for filtering the magnetic floc from the treated fluid including the magnetic floc as the treated fluid flows through the net to an exit of the tank.

11. The magnetic separation filtering and cleaning apparatus according to claim 10, wherein
the magnetic field generation device comprises a plurality of permanent magnets in the rotating body, and a protection body for protecting the plurality of permanent magnets to keep them watertight.

12. The magnetic separation filtering and cleaning apparatus according to claim 10, wherein
the magnetic field generation device comprises a plurality of permanent magnets in the rotating body, a protection body for protecting the plurality of permanent magnets to keep them watertight, and a clamping device for fixing the rotating body onto the protection body.

13. The magnetic separation filtering and cleaning apparatus according to claim 10, further comprising:
a control device for controlling a rotation speed of the magnetic field rotating device to rotate the magnetic field generation device in synchronization with a flow velocity of the treated fluid including the magnetic floc in the second flow channel.

14. The magnetic separation filtering and cleaning apparatus according to claim 10, wherein
the filtering device is a rotating drum and the net disposed over an outer circumferential surface of the rotating drum.

15. The magnetic separation filtering and cleaning apparatus according to claim 14, further comprising
a shower pipe disposed on an inner side of the of the rotating net, the shower pipe is positioned to spray a clarified fluid on the inner side of the rotating net to remove accumulated magnetic floc from an outer side of the rotating net.

16. The magnetic separation filtering and cleaning apparatus according to claim 10, further comprising
a shower pipe disposed on a first side of the of the rotating net, the shower pipe is positioned to spray a clarified fluid on the first side of the rotating net to remove accumulated magnetic floc from a second side of the rotating net.

* * * * *